Figure 1:
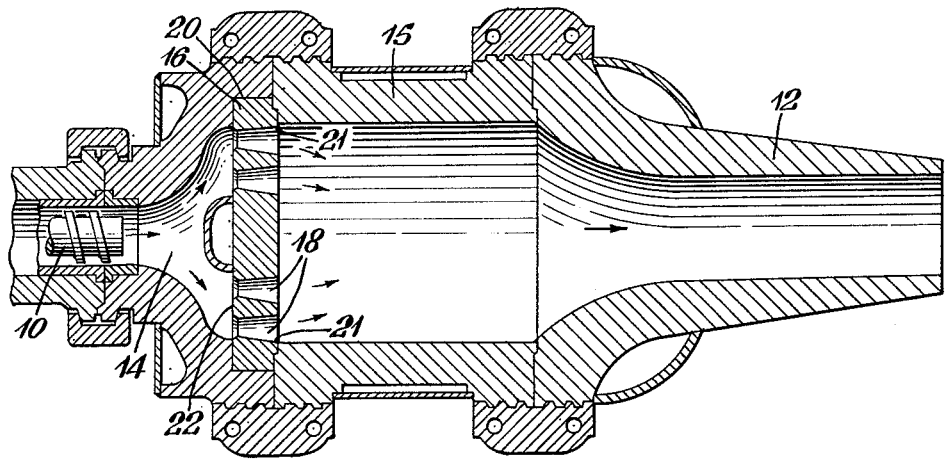

July 27, 1965   E. G. SHESLER ETAL   3,196,486
AUGER EXTRUSION FOR FURNACE ELECTRODES
Filed April 16, 1962

INVENTORS
ELMER G. SHESLER
ELMER A. BOWEN
RONALD F. BURDEN
BY
ATTORNEY

United States Patent Office 3,196,486
Patented July 27, 1965

3,196,486
AUGER EXTRUSION FOR FURNACE ELECTRODES
Elmer G. Shesler, Fostoria, Elmer A. Bowen, Findlay, and Ronald F. Burden, Fostoria, Ohio, assignors to Union Carbide Corporation, a corporation of New York
Filed Apr. 16, 1962, Ser. No. 187,635
4 Claims. (Cl. 18—12)

This invention relates to pitch bonded carbon furnace electrodes, and more particularly it relates to a novel auger extrusion apparatus for making the same.

The conventional method of extruding furnace electrodes is one wherein a hot carbonaceous mix is first compacted in a cylindrical "mud chamber" and then extruded through a forming die, the extrusion pressure being applied to the mix in the mud chamber by means of a hydraulic ram.

Auger extrusion of electrodes offers several important advantages over the above conventional extrusion process. Namely, the use of a mechanically driven auger allows the extrusion process to be made continuous due to the fact that dry unheated mix blend may be fed directly to the feed auger. Another advantage lies in the fact that the application of vacuum to the mix to remove entrapped air is much more effective in the auger process and a higher density product results.

Unfortunately, previous attempts at forming electrodes which have a diameter larger than the diameter of the auger have always failed because of the poorly knit spiral internal structure which was obtained in the product. This poor structure is the result of a phenomenon which is termed "coring." Coring occurs because the electrode mix blend which exits from the smaller diameter auger to the larger diameter forming die has a tendency to flow very slowly along the walls of the forming die and very rapidly in the straight through center portion of the forming die which is directly in line with the auger. Accordingly, a non-uniform electrode with an unacceptable internal structure results.

Accordingly, the principal object of the invention is to provide an auger extrusion apparatus which is suitable for forming electrodes of a diameter which are larger than the diameter of the auger.

Broadly stated, the objects of the invention are accomplished by an auger extrusion apparatus wherein a critically designed passageway, the exit of which is partially blocked with a restricting plate which modifies the line of flow of the mix, is provided between the smaller diameter auger and the larger diameter forming die.

More specifically, in the practice of this invention, a circularly section expansion chamber which widens to a diameter of at least approximately 1.2 and preferably 1.5 times the diameter of the throat of the forming die is provided at the exit end of the auger. Transverse the auger and expansion chamber axes at the exit of the expansion chamber, a restricting plate which suitably may take the form of a shredder plate or baffle plate is provided which breaks up the spiral structure of the mix stream exiting from the auger and prevents the flow of the mix in a direct line from the auger to the forming die, and instead promotes a turbulent flow of mix. Furthermore, in order to insure the production of electrodes having normal properties, it has been found necessary to provide a non-tapering orientation sleeve between the shredder plate or baffle plate and the entrance of the forming die. This orientation sleeve has a uniform diameter and is of such a size that it receives freely the mix stream as it passes the baffle or shredder plate. By normal properties it is meant that an electrode produced with the auger apparatus of the invention has the same physical properties as would be present if a similar mix was employed in producing an electrode with a prior art hydraulic extrusion apparatus.

Figure 2:
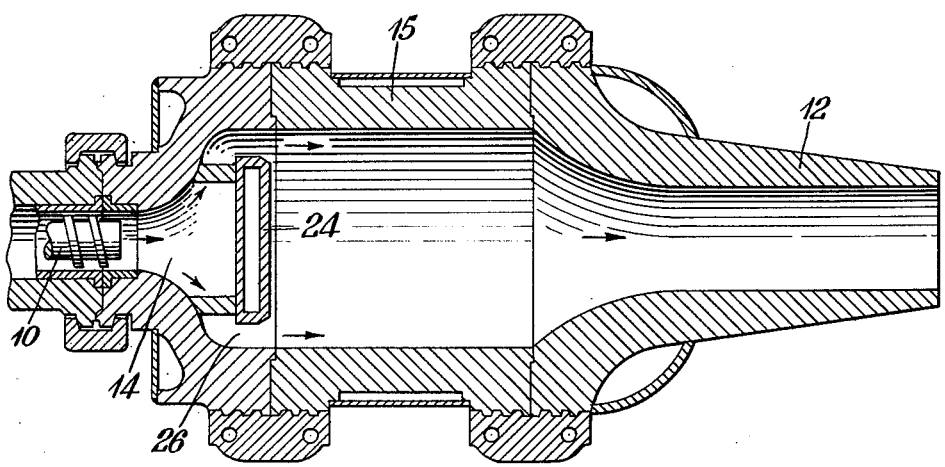

The invention will be more readily understood by reference to the accompanying drawing, wherein:

FIG. 1 is a sectional view, in elevation, of the apparatus of the invention utilizing a shredder plate; and FIG. 2 is a sectional view, in elevation of the apparatus of the invention utilizing a baffle plate.

Referring now to the drawing, and more particularly to FIG. 1, the apparatus of the invention comprises an auger 10 and a forming die 12 of larger diameter than the auger 10 with an expansion chamber 14 and an orientation sleeve 15 positioned therebetween. The expansion chamber 14, is of a generally circular cross section having a diameter approximately 1.5 times the diameter of the throat of the forming die 12 that is used. Transverse to the auger and expansion chamber axes at the exit of the expansion chamber 14, a restricting shredder plate 16 is provided to break up the spiral structure of the mix stream exiting from the auger 10 and to promote turbulance in the otherwise direct line flow of mix from the auger to the forming die 12 to thereby prevent coring from occurring. A plurality of apertures 18 are provided in the shredder plate 16 and are located around the periphery 20 of the plate 16. The diameter of the orientation sleeve 15 is equal to the diameter of the locus of the outer edges 21 of the apertures 18 which are disposed about the periphery of the shredder plate 16. For optimum results the apertures 18 taper from the inlet side 22 of the plate 16 at 30° minimum inclusive angle. In the preferred embodiment, some means for controlling the temperature of the shredder plate would be provided.

The shredder plate 16 of FIG. 1 may be replaced by other means for controlling the flow of mix in the desired manner, such as the solid baffle plate 24 of FIG. 2. In this embodiment, the baffle plate 24 is so mounted that the mix will flow through the annular space 26 provided between the baffle plate 24 and the wall of the expansion chamber 14. In this embodiment, the diameter of the orientation sleeve 15 is equal to the outside diameter of the annular space 26.

In the practice of the process of the invention with the above described apparatus it has been discovered that electrodes in a wide range of diameters which are larger than the diameters of the auger may be extruded without changing the auger size. Considering that electrodes are manufactured in diameters ranging from as little as 4 inches to as much as 40 inches, the ability to make a flaw free product without regard to auger size represents a significant processing advantage.

Specific examples of the practice of the invention are the following:

Example I

A 5¼ inch diameter electrode was formed using a 3½ inch diameter auger with an 8 inch diameter expansion chamber. The pitch bonded carbon blend comprised 55% calcined petroleum coke flour, 19.2% calcined coke particles, 1.5% iron oxide as a buffing inhibitor, 3.7% summer oil and 20.6% coal tar pitch.

The blended materials from which the electrodes were made, were extruded on a double auger machine to which the nearly dry blend at room temperature was introduced through the upper auger to a vacuum chamber for removal of air and then through a lower extrusion auger which forces the blended material into the expansion chamber, thence through or around the restricting plate in a turbulent manner, thence through an orientation sleeve into the forming die wherein the electrode is formed.

Example II

A 14 inch diameter electrode was formed using an 8 inch diameter auger with a 30 inch diameter expansion chamber. The pitch blended carbon blend comprised 34.8% calcined petroleum coke flour, 42.5% calcined coke particles, 1.9% summer oil, and 20.8% coal tar pitch.

The extrusion process was carried out exactly the same as in Example I.

Service performance characteristics of auger extruded electrodes which were produced as above were tested under controlled conditions in a steel melting and refining furnace and were found to be equal to conventionally produced electrodes. In addition, the internal structure of the auger produced electrodes were entirely free from spiral flow lines or other flaws which might be attributable to the mechanics of extrusion.

This application is a continuation-in-part of U.S. Serial No. 66,470, filed November 1, 1960 and now abandoned by E. G. Shesler, E. A. Bowen and R. F. Burden.

We claim:

1. An apparatus for the extrusion of pitch bonded carbon electrodes which comprises an auger for delivering a carbonaceous mix stream to a forming die of a larger diameter than the diameter of said auger, an expansion chamber adjacent said auger, said expansion chamber having a generally circular cross-section of a diameter at least approximately 1.2 times the diameter of said forming die, and an orientation sleeve of uniform diameter intermediate said expansion chamber and said forming die, said expansion chamber being provided with a stationary plate spaced apart from the exit aperture of said chamber and being of such diameter that it defines an annulus between its periphery and the periphery of said expansion chamber thereby eliminating the coring effect of said auger by obstructing the flow of the straight through center portion of the mix such that the mix upon emerging from the central zone of said die is flowing at substantially the same speed as said mix exiting along the peripheral walls of said die.

2. An apparatus for the extrusion of pitch bonded carbon electrodes which comprises an auger for delivering a carbonaceous mix stream, a forming die of a larger diameter than the diameter of said auger, an expansion chamber adjacent said auger, said expansion chamber having a generally circular cross-section of a diameter at least approximately 1.2 times the diameter of said forming die, and an orientation sleeve of uniform diameter intermediate said expansion chamber and said forming die, said expansion chamber being provided with a stationary plate, said plate in juxtaposition with and partially blocking the exit aperture of said expansion chamber whereby the spiral structure of said carbon mix stream exiting from said auger is broken up and said plate having a plurality of uniformly disposed apertures about its periphery, and the diameter of said uniform diameter orientation sleeve is equal to the diameter of the locus of the outer edges of said apertures disposed about said periphery of said plate.

3. The apparatus of claim 2 wherein said apertures taper from the inlet to the outlet side of said plate at a 30° minimum inclusive angle.

4. An apparatus for the extrusion of pitch bonded carbon electrodes which comprises an auger for delivering a carbonaceous mix stream, a forming die of a larger diameter than the diameter of said auger, an expansion chamber adjacent said auger, said expansion chamber having a generally circular cross-section of a diameter at least approximately 1.2 times the diameter of said forming die, and an orientation sleeve of uniform diameter intermediate said expansion chamber and said forming die, said expansion chamber being provided with a stationary plate, said plate in juxtaposition with an partially blocking the exit aperture of said expansion chamber whereby the spiral structure of said carbon mix stream exiting from said auger is broken up and said plate defining an annulus between its periphery and the periphery of said expansion chamber, and the diameter of said uniform diameter orientation sleeve is equal to the outside diameter of said annulus.

References Cited by the Examiner
UNITED STATES PATENTS

| | | | |
|---|---|---|---|
| 2,469,999 | 5/49 | Stober | 18—12 |
| 2,513,795 | 7/50 | Gliss | 18—13 |
| 2,728,943 | 1/56 | Hertz et al. | 18—12 |
| 2,770,836 | 11/56 | Hankey | 18—12 |
| 3,018,516 | 1/62 | Clinefelter | 18—14 |

MICHAEL V. BRINDISI, *Primary Examiner.*